UNITED STATES PATENT OFFICE.

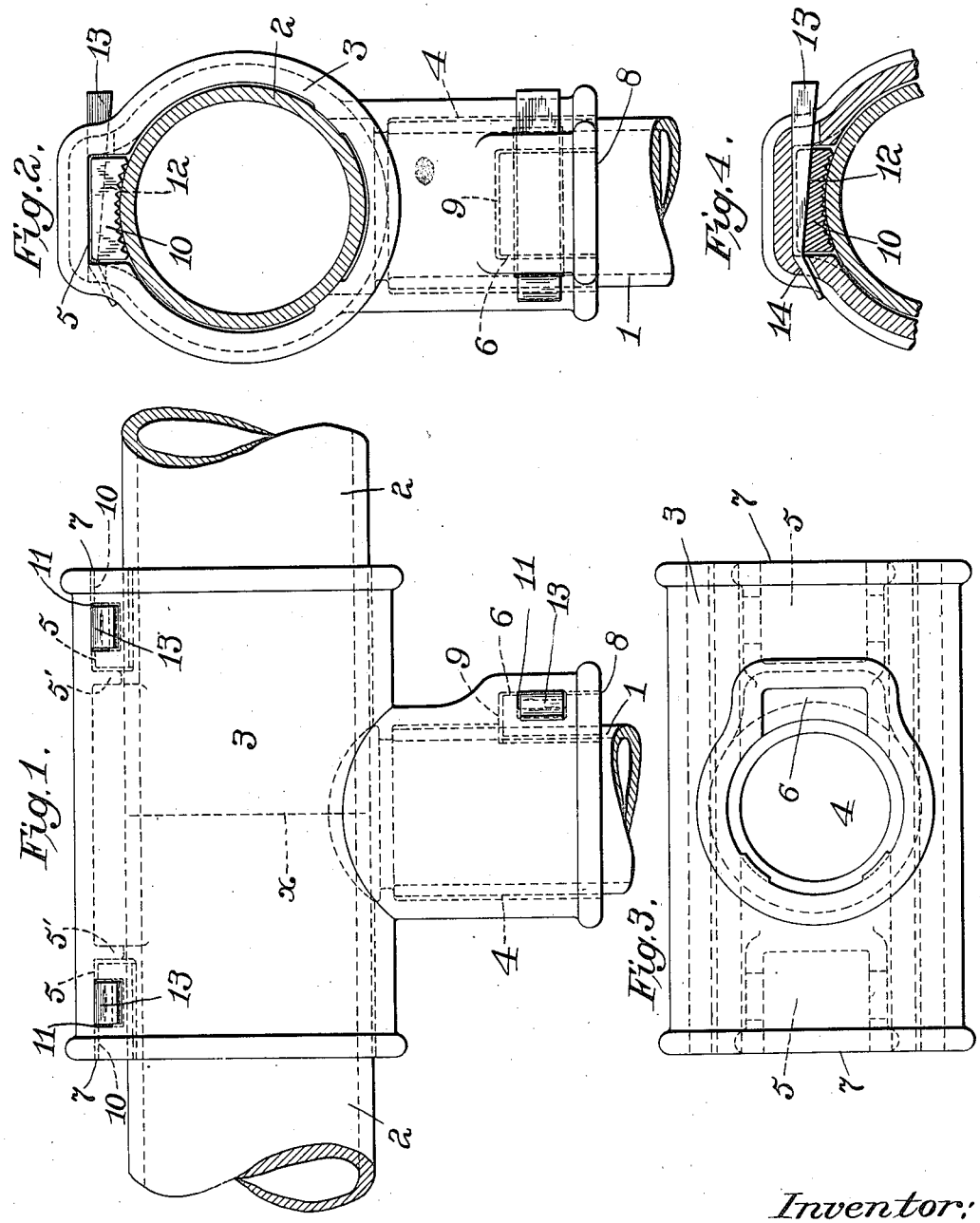

ARCHIBALD B. HORNE, OF CHICOPEE, MASSACHUSETTS, ASSIGNOR TO A. G. SPALDING & BROS. MANF'G CO., OF CHICOPEE, MASSACHUSETTS, A CORPORATION OF MASSACHUSETTS.

MEANS FOR UNITING FRAME PARTS TOGETHER.

1,232,447.  Specification of Letters Patent.  Patented July 3, 1917.

Application filed April 17, 1915. Serial No. 22,082.

*To all whom it may concern:*

Be it known that I, ARCHIBALD B. HORNE, a citizen of the United States, residing at Chicopee, Massachusetts, have invented certain new and useful Improvements in Means for Uniting Frame Parts Together, of which the following is a specification.

My invention is designed to expedite the erection of frame work such as is employed on children's play-grounds and to provide such a construction of coupling or uniting means as will insure a firm holding of the parts together and one which will be permanent and not easy to tamper with or remove by malicious and mischievous persons.

Another object of my invention is to provide such a construction of uniting means for the frame parts as will permit the joint to be made without the use of special tools, only a hammer or some such implement being necessary.

The invention is shown in the accompanying drawing, in which,

Figure 1 is a front view of parts or members of the frame to be united together with the coupling or joining piece and the means for holding these parts together.

Fig. 2 is a view looking from the right of Fig. 1 with one of the frame members in section.

Fig. 3 is a bottom plan view of the coupling or joining member, and

Fig. 4 is a detail of a modified form of wedging means.

In these drawings, 1 indicates an upright member constituting part of the frame to be erected and 2 indicates a horizontal member of said frame which must be connected with the frame part 1. For making this connection I employ a coupling 3 in the form of a pipe fitting and of T-shape. This T fitting receives the member or members 2, said fitting having an opening passing through it horizontally to receive the frame members 2 and having a vertical socket portion 4 to receive the pipe frame member 1. The fitting is provided with pockets or recesses, two of these being shown at the upper parts of the horizontal portion of the fitting as at 5, 5 and one pocket or recess being shown at 6 on the vertical portion of the fitting. These pockets are provided by enlarging the fitting at these points. Each pocket is open at the adjacent end of the fitting as at 7 and 8 and the pockets 5 are defined at their inner ends by the walls 5; while the pocket 6 is defined at its inner end by the wall 9 of the casting of which the fitting is made. These pockets are adapted to receive holding dogs or grips which are of general rectangular form, as shown at 10, (Fig. 2) the inner face of each dog being serrated so that the teeth provided by these serrations will firmly grip the pipe or other frame member as shown in Fig. 2. Each dog is preferably channeled as at 11 (Fig. 1) and the bottom of this channel, as shown at 12 (Fig. 2) is inclined.

A key 13 is driven through an opening in the wall of the enlargement of the fitting and through the recess in the dog, the inner face of this key being inclined to fit the inclined surface of the dog and the outer face of the key being in such relation that it will fit against the inner face of the outer wall of the recess. The end of the key is bent down as shown in Fig. 2 so as to lock the key in place and this bending of the key may take place as a result of driving it into position by providing a suitable form of incline at 14 against which the thin end of the key bears as it is forced into locking engagement with the dog or the end of the key may be bent down by striking it with a hammer or like implement, the said key being made of soft steel for this purpose.

By driving the key into place the wedging action between the key and the dog forces the latter into strong gripping engagement with the frame part which is to be held.

I prefer to employ two locking means on the horizontal portion of the fitting, one at each end thereof so that two frame members may be introduced into this fitting, one from each end, one frame member being held by the dog at the left of Fig. 1 and the other frame member by the dog at the right of Fig. 1, the dotted line *x* indicating where these two frame members come together.

For holding the fitting and the upright member 1 together, it will be sufficient to employ one dog as shown though more may be used if desired.

Various means have been used heretofore for uniting the parts of a play-ground frame together, for instance, by threading the pipe and the fitting and screwing one into the other or by the use of set screws and a wrench, the former construction being costly to make and inconvenient to erect and requiring considerable time in its assembling and proper uniting and the other construction mentioned requiring protuberances on the fitting, and rendering it possible for mischievous or malicious persons to loosen or remove the connection. Other constructions which have been used involve splitting of the fittings and the use of bolts to clamp the parts together. These frames for use as play-ground apparatus are in some instances made fifteen or sixteen feet high and the use of bolts necessitating the employment of double wrenches in order to tighten them properly is an undesirable construction as a uniting means.

The means employed by me provide for the quick uniting of the parts of the frame and provides also a construction which cannot readily be tampered with and one which insures safety because of its permanent character.

What I claim is:—

In combination a fitting, a frame member adapted thereto, said fitting having a recess, a holding dog in the said recess, said fitting having an inclined surface and a key having its end bent down by engaging said incline, said key holding the dog in contact with the frame member, substantially as described.

In testimony whereof, I affix my signature in presence of two witnesses.

ARCHIBALD B. HORNE.

Witnesses:
  I. M. CONVERSE,
  I. K. GANLEY.